CURRENT STEERING CIRCUIT

Original Filed Dec. 24, 1958 2 Sheets-Sheet 1

INVENTOR.
ALBERT J. MEYERHOFF
HAROLD C. GOODMAN

William E. Cleaver

AGENT

*INVENTOR.*
ALBERT J. MEYERHOFF
HAROLD C. GOODMAN
William E. Cleaver
AGENT

United States Patent Office 3,351,924
Patented Nov. 7, 1967

3,351,924
CURRENT STEERING CIRCUIT

Albert J. Meyerhoff, Wynnewood, Pa., and Harold C. Goodman, Newport Beach, Calif., assignors to Burroughs Corporation, Detroit, Mich., a corporation of Michigan Continuation of application Ser. No. 782,752, Dec. 24, 1958. This application Nov. 27, 1964, Ser. No. 415,859
8 Claims. (Cl. 340—174)

This application is a continuation of copending application Ser. No. 782,752, now abandoned, of A. J. Meyerhoff and H. C. Goodman, filed Dec. 24, 1958.

This invention relates to data storage systems and in particular to read-write drive circuits associated with magnetic memory systems.

Magnetic core memory systems have been extensively employed in present day data processing methods. A discussion of the basic concepts and history of development of the magnetic core memories is found in an article entitled "Static Magnetic Matrix Memory and Switching Circuits," by J. Rajchman, RCA Review, June 1952.

As described in this last mentioned reference, the magnetic cores store binary bits of information by being driven to one of two states of magnetization. The two states of magnetic remanence are of opposite polarity and can be arbitrarily designated as a "one" state or a "zero" state, to provide a basis for the binary language of a data processing system. The magnetic cores are normally arranged in a matrix on a plane according to rows and columns. The read operation and the write operation of a magnetic core arrangement has been, for the most part, accomplished by a coincident current technique. According to this technique, the magnetic cores lying along a particular row can be simultaneously subjected to a switching current, while at the same time the magnetic cores lying along any particular or selected column can be subjected to a switching current. Usually the switching currents to which the cores along the selected rows and columns are subjected have values which are one-half the current necessary to produce an M.M.F. which will switch a core from one state of magnetization to the other. Since these switching currents normally have one-half the value necessary to effect switching, it becomes clear that the particular core which is at the intersection of the selected row and the selected column will be subjected to unity switching current. Therefore, this particular core will be switched to the particular magnetic remanence state whose flux polarity is in keeping with the flux produced by the switching current. If the particular core subjected to the unity or necessary switching current was initially in, for instance, a "one" state of magnetization, the change of flux in that core would be sufficient to induce a current on a sensing winding, and therefore a "one" condition or bit would be sensed.

This scheme has been generally satisfactory excepting that in effecting the coincidence the energization of the row wire and the column wire results in a partial driving of numerous magnetic cores other than the desired core. Each of the cores other than the designated core at the intersection, indicated above, which lies along either the selected row wire or the selected column wire, is partially driven toward one of the two states of magnetization mentioned above. If, as is ordinarily the case in the read operation, there is an attempt to drive a core to the "zero" condition so as to be able to sense an initial "one" state, then all of the cores lying along the selected row and the selected column have been partially driven to the "zero" state. In a similar manner, in the write operation, if the drive current or switching current drives, or attempts to drive, the selected core at the intersection toward the "one" state, then all of the cores lying along the selected column and the selected row are partially driven to the "one" state. The partial driving of the cores gives rise to noise and spurious signals which are undesirable in any data processing system.

If the memory system is required to operate at relatively high speeds, for instance, less than 5 microseconds for a read-write cycle, or be subjected to large variations in ambient temperatures, the presence of the noise described above creates a serious design limitation in magnetic core memories. In order to provide an operation which might function at relatively high speed read-write cycles and/or under large ambient temperature variations, the latter of which affects core characteristics, a linear selection technique or word organized memory technique has been adopted. A comparison between the two systems can be found in the technical paper by R. McMahon, presented at the Transistor and Solid State Circuits Conference, February 1958, and published in a publication entitled "Digest of Technical Papers" (for the above mentioned conference), by L. Winner, printed by the O'Brien Suburban Press, Norwalk, Conn.

In the word organized memory technique there is found a plurality of cores each of which is located on a different plane, and each of which represents a binary bit in a particular word. Each core associated with a word is threaded by the same single wire. In other words, there is a single wire passing through a plurality of planes and threading or otherwise engaging a single core on each of these planes such that all the cores engaged by the single wire collectively represent a word. During a read-out operation the bits respectively stored in the cores are read out in parallel with one bit being read from each plane. In this technique, a word is read out by passing a single read current driver pulse along the single wire described above.

The word organized technique to date has been to provide either a drive transformer or a drive square-loop switching core for each of the single threading wires. In the drive transformer adaptation, a transformer couples an address lead wire from an address switching circuit to the single wire threading the group of cores representing the word. The memory cores in which the bit information is stored are driven bi-directionally. The memory cores are driven, first, in the read direction by a read driving current passing through the primary of the transformer and delivered by the secondary winding of the transformer along the single common circuit wire. When a write operation is to be effected, the flyback of the transformer provides some predetermined percentage of the necessary write drive current, while an additional winding on each plane which threads all cores on the plane, and herein called an "information driver winding," provides the remaining percentage of the write driver current to effect the switching of the core. The necessity for the information driver current becomes clear when it is considered that each of the memory cores may be assigned a different binary bit to be stored in order to form a word, for instance, the coded word 1–1–0–0. Although these cores are partially driven simultaneously, there must be an added control to selectively designate which of the cores in the word is to represent a "one" and which a "zero." With the use of the drive transformer, the write pulse generated by the flyback effect has been found to be unsatisfactory. For example, it has been found that critical damping is needed to prevent the flyback from spawning instantaneous read direction currents.

In systems using the square-loop drive switching core, the address matrix lead passes a pulse to drive the switching core for a read operation. The single wire threading the memory cores engages the switching core and the current induced by the switching core flux change serves to switch the memory cores. The switching core is reset after a read pulse by a reset pulse of opposite polarity from the read pulse. The reset pulse induces a write drive current in the single winding to partially switch the memory cores. The switching cores are to be distinguished here so as not to confuse them with the memory cores wherein the information bits are stored. The switching cores, as do the switching transformers, form a separate matrix which aids in the address operation. When one of these particular switching cores, or transformers, is selected by an address switching matrix, these transformers, or switching cores, serve to provide a driving current bidirectionally along the single wire threading the group of member cores forming a word. A D-C reset is applied to the switching cores continually and must be overcome by a read-out address pulse. It becomes clear that when the read-out signal on the switching core is terminated, the D-C reset will drive the core in the opposite direction so as to effect a sharp write pulse. As with the transformer operation, however, the write drive current provided by the switching cores represents only a percentage of the current necessary to actually switch a memory core from one state of magnetization to the other.

With the use of the switching core, there is requisite critical design tolerances since it is a well understood principle in magnetic operations that the net flux present in the switching core for a read-write cycle must be zero lest there occur a "creeping" of the flux density of the core. In other words, if there were a group of cores each in the "one" state of magnetization and these cores were switched to the "zero" state of magnetization, the amount of flux in the switching core would be relatively high when compared with the amount of flux in the switching core had these memory cores been in the "zero" state originally. This is true because as the current from the secondary passes through the memory cores and commences to switch them from the "one" to the "zero" state, there is a back E.M.F. built up which reduces this secondary winding current. With a reduced current in the secondary winding on the switching core, the amount of flux bucking the flux produced by the current in the primary core is less, and hence the net amount of flux or flux level in the switching core after the memory cores have been switched is high. Now, during the write cycle the memory cores which had been in the "one" state are now in the "zero" state and the single wire threading these cores presents a shorted turn on the switching core. With a shorted turn on the switching core, there is a large amount of flux produced by the secondary winding which bucks the flux produced by the reset winding. The reset winding is now the write coil. It follows that with the large bucking flux being produced in the secondary coil, it will take a long time for the net flux remaining from the read cycle to be wiped out by the flux being produced by the write coil. This problem is overcome by placing a "swamping" resistor in series with the single wire threading the memory cores. The swamping resistor tends to give a very nearly constant current in the single wire whether or not there are cores to be switched during a read or a write cycle. The switching core can be returned to its original condition by the reset current. It can have the net flux from the read cycle wiped out therefrom in a time which is inversely proportional to the size of the swamping resistor in series with the single threading wire. Obviously, to get high read-write cycles, the swamping resistor is made large and this gives rise to a waste of power which is an undesirable characteristic of the prior art circuit just described.

It is therefore the object of this invention to provide an improved bidirectional current steering circuit.

It is a further object of the present invention to provide a bidirectional driving current circuit to be used with a magnetic core memory system at relatively high speed read-write cycles.

It is a further object of the present invention to provide a bidirectional driving current circuit building block, which can be arranged in a matrix to provide a large magnetic core memory.

In accordance with a main feature of the present invention there is provided a pair of unidirectional current conducting devices which are series coupled one to the other and a single wire which threads a plurality of magnetizable cores and which has one end connected to the common point between said pair of unidirectional devices. This circuit arrangement provides two preferred different direction current conducting paths with assurance against back circuits when a plurality of these circuit arrangements are connected to form a large memory device.

In accordance with another feature of the present invention there is provided a pair of current generating devices each of which generates current to flow respectively over the two preferred paths of the above-mentioned feature.

In accordance with another feature of the present invention there is provided a voltage reference source connected to an end of the single wire of the first feature which end is opposite to the end of the single wire having the common connection of the unidirectional devices. This reference voltage source has predetermined voltage magnitudes necessary to effect either a read or a write operation with respect to the cores through which the single wire is running.

The foregoing and other objects and features of this invention will be best understood by reference to the following description of an embodiment of the invention taken in conjunction with the accompanying drawings wherein.

Figure 1:
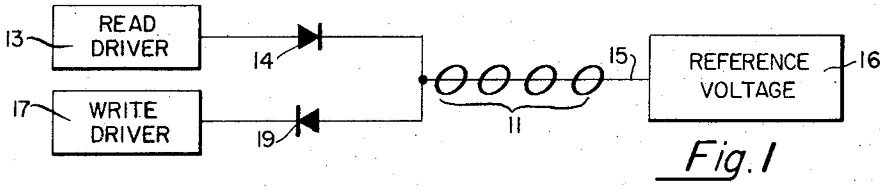
FIG. 1 is a block schematic diagram of the basic building block read-write drive circuit.
Figure 8:
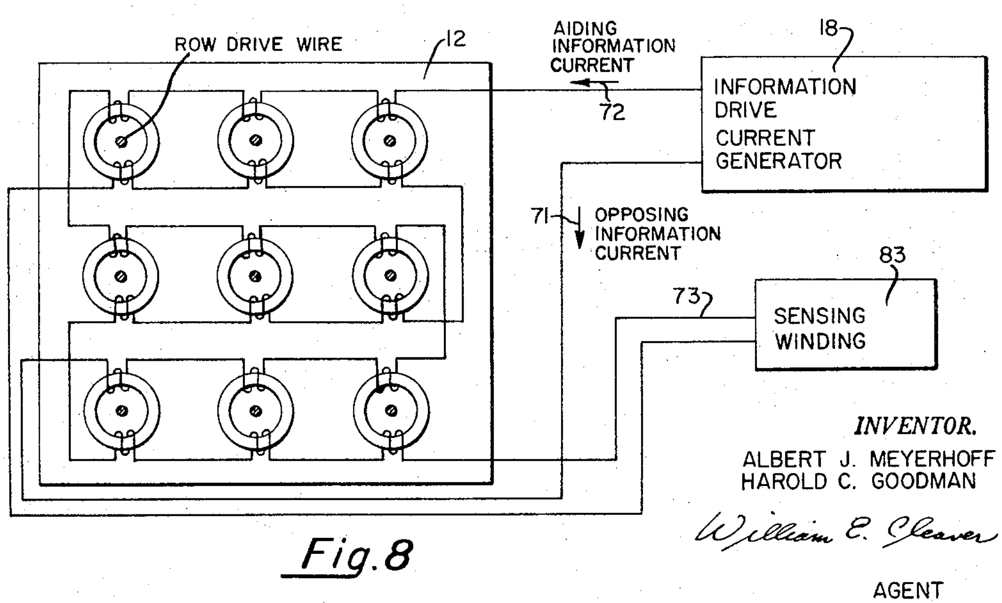
FIG. 8 is a schematic of the cores on a core plane including the information driver wire and the sensing wire.

For a better understanding of the operation of the invention and referring in particular to FIG. 1, there is found a plurality of magnetizable cores 11. Each of the cores in the group 11 is to be understood as being on a different individual plane, one of which is shown in FIG. 8, each plane being separate one from the other. On every plane there will be many cores, each of which operates in conjunction with other cores on other planes (according to the example of FIG. 1, with three other cores on three other planes), to make up a plurality of words, four bit words in the present example. Each group of four cores which forms a word is threaded by a single wire. Although four cores are shown in the embodiment of FIG. 1, it is to be clearly understood that the number of planes with which the circuit might operate is not limited to four. There may be any number of planes depending upon the number of bits necessary to represent a word in the system. It is also to be understood that, although not shown in most of the figures of the disclosure, there is employed on each of the cores two windings other than the read-write drive wire. These two other windings are shown in FIG. 8 and are respectively an information drive current winding, hereinafter referred to as the ID winding, and a sensing winding. The ID winding is a wire which is coupled to each core on a plane, there being a different ID winding for each plane, and during a write operation this winding is energized in one polarity or the other, thus applying a magnetizing force to each core on a particular plane. Likewise, the sensing winding is coupled to each core on a plane, a different sensing wire being provided for each different plane. When a particular core is read, there is a signal induced in the sensing winding if the particular core has been in a predetermined condition of magnetization, as will be described hereinafter.

Assume in FIG. 1 that the cores 11 are magnetized in particular states such that reading from left to right, the states of magnetic remanence represent 1–0–1–0. Further, assume that the particular circuit shown in FIG. 1 his received a signal from some address circuitry, not shown. The address circuitry will signal the read driver 13 that the data processing system is requesting a read-out of the cores 11. At this time the read driver 13 will generate a current which will pass through the diode 14, along the single wire 15, to the reference voltage source 16. The current passing along the single wire 15 will produce a magnetizing force in each of the cores 11 of a polarity tending to drive each core to the "zero" state. If the first and third cores, as in the hypothesis, are in a state of magnetic remanence corresponding to a "one," then the current passing along the wire 15 causes the flux in the first and third cores to change to the other, or "zero" state, and the respective sensing windings on the first and third cores will have a signal induced therein which will indicate a "one" read out. Since there will be no change of flux in the second and fourth cores which were already in the "zero" state, no signal is induced in their respective sensing windings, and the data processing system will interpret these two cores as having had a "zero" information bit stored therein. Hence, the word 1–0–1–0 will be read out. Now assume that the system is instructed to write binary information bits into the cores 11. These cores are in the "zero" state from the last described read-out operation. If the new word to be written is 1–1–0–0, then the system must condition the first and the second cores to store a "one" and the third and fourth cores to store a "zero." The conditioning of the cores as such is accomplished by a coincidence technique. The system activates the write driver 17 of FIG. 1 and also the information drive current generator 18 of each plane, one of which is shown in FIG. 8. With respect to the basic circuit of FIG. 1, current passes from the reference voltage source 16, along the threading wire 15 through the cores 11, through the diode 19 to the write driver 17. The circuit parameters are so selected that the write driver current has a value which is two-thirds of the total current necessary to fully switch a core from a "zero" state of magnetization to a "one" state of magnetization. Simultaneously, during this write operation, the ID winding of the core plane (see FIG. 8) carries a current to produce a magnetizing field on each core of its associated plane. The circuit parameters are so chosen that current passing in the ID winding has a value which is one-third of the total current value necessary to fully switch a core from "zero" to "one." The information drive current generator is arranged to provide current flow in either of two directions in order that the ID current can set up a magnetic field in the cores of its associated plane which is either aiding or opposing with respect to the field produced by the write drive current. To effect a "write-in" of the coded word 1–1–0–0, the first two planes will be provided with an aiding ID current, while the third and fourth planes will be provided with an opposing ID current. The magnetizing force provided by the information drive current when added to the magnetizing force provided by the write drive current will cause the first and second cores of the core group 11 to be driven to a state of magnetization which is representative of a "one." However, in the third and fourth planes the force provided by the opposing current will buck the force produced by the write-drive current, and hence there will be a net force applied to the third and fourth cores of only one-third that necessary to switch these last-mentioned cores to the "one" state.

Figure 2:
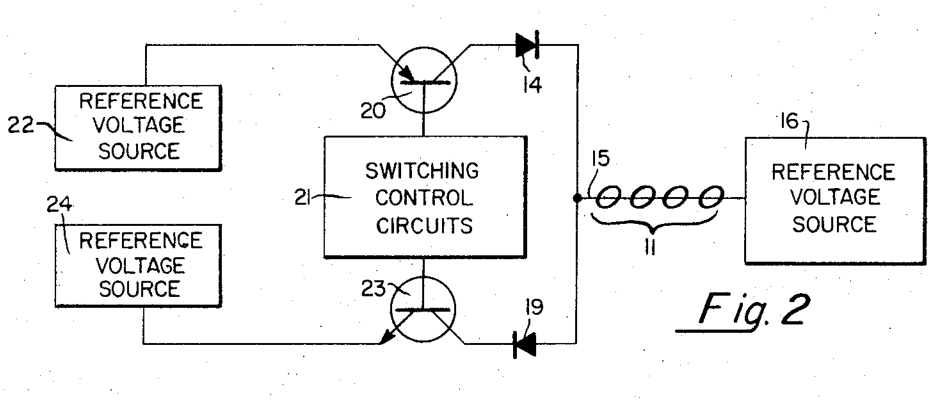
FIG. 2 is a block schematic diagram showing the read-write drivers as symmetrically coupled PNP–NPN transistors.

In FIG. 2, the PNP transistor 20 is shown in the role of read driver. The switching control circuits 21 apply a negative potential to the base of the transistor 20 which causes current flow from the positive reference voltage source 22 through the transistor 20, through the diode 14, along the single wire 15 to the ground reference voltage source 16 in the "read" direction. In a similar manner, the switching control circuits 21, when a "write" operation is desired, apply a positive potential to the base of the NPN transistor 23 which causes current flow from the ground reference voltage source 16, along the single wire 15, through the diode 19, the NPN transistor 23 to the negative reference voltage source 24.

Figure 3:
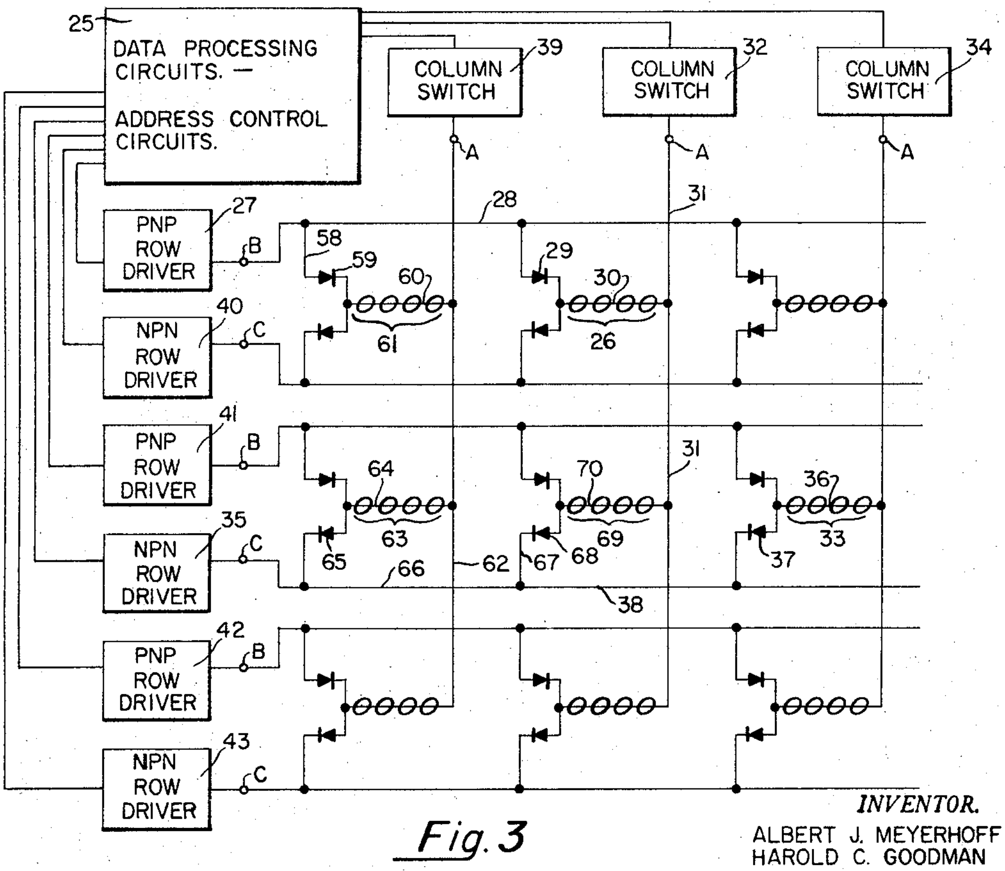
FIG. 3 shows a 3 x 3 matrix with the column switch connections indicated as A, the PNP row driver connections indicated as B, and the NPN row driver connections indicated as C.

In FIG. 3, there is shown a 3 x 3 matrix to accommodate a storage of nine four-bit words. If the data processing system 25 desires a read-out of the information bits forming the word stored in the cores 26, the PNP row driver 27 would be conditioned by the address control circuitry to generate a read current. The read current would pass along the line 28, through the diode 29, along the single wire 30, upward along the line 31 to the column switch 32. The address circuitry which decides that the cores 26 are to experience a read-out operation would simultaneously condition the row driver 27 and the column switch 32 to provide the last-described current conduction path. The address control circuitry can be any well known diode matrix. If, after the read-out of the cores 26 has been completed, the data processing system 25 decides to write a word into the cores 33, the address switching circuitry will condition the column switch 34, and the NPN row driver 35. Current would then flow from the column switch 34, through the cores 33, along the wire 36, through the diode 37, along the wire 38 to the row driver 35. It follows that a read or write operation for any particular word shown in FIG. 3 can be effected with the selection of any of the column switches 32, 34 or 39 and a simultaneous selection of one of the row drivers 27, 35 or 40 through 43.

Figure 4:
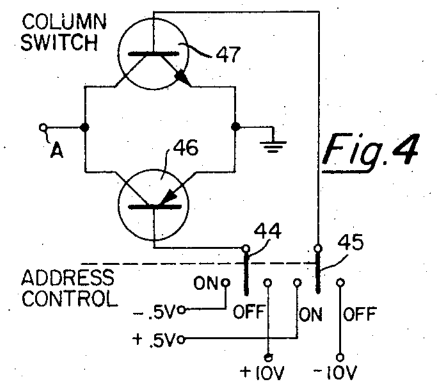
FIG. 4 is a schematic diagram of the column switch showing the connection A and a symmetrical PNP–NPN arrangement.

In FIG. 4 there is shown an embodiment of a column switch circuit which might be used as the circuits in any of the blocks 32, 34 and 39 in FIG. 3. If the data processing system decides to read or write with respect to a group of cores along any vertical column of FIG. 3, the particular column switch for the selected vertical column is chosen and an electronic operation analogous to the mechanical transferring of the switch arms 44 and 45 of FIG. 4 takes place. With the switch arms 44 and 45 transferred to the "on" side, it is seen that —.5 volt is applied to the PNP transistor 46, and simultaneously +.5 volt is applied to the base of the NPN transistor 47. With this arrangement, both transistors are primed and it makes no difference whether the data processing system is demanding a write or a read operation. If a read operation is to take place, then a positive voltage will appear at the connection point A of FIGS. 3 and 4 will render the NPN transistor 47 operative. In a similar manner, if a write operation is to take place, a negative voltage will appear at the connection point A and will render the PNP transistor 46 operative.

Figure 5:
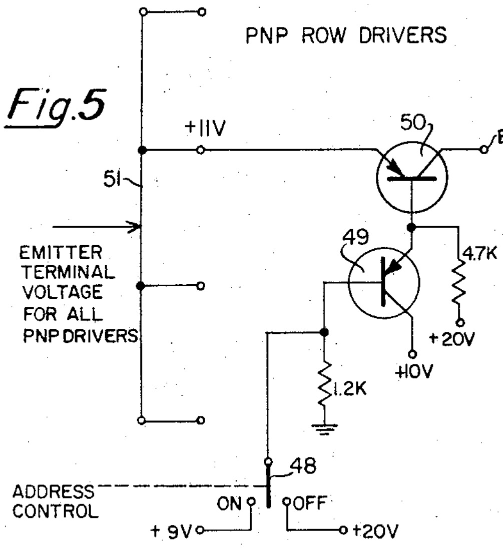
FIG. 5 is a detailed schematic diagram of the PNP row driver showing the B terminal of FIG. 3 and some representative voltage values.

In FIG. 5, there is shown a schematic with some representative values for a PNP row driver which might be used as circuitry represented by the blocks 27, 41 and 4[illegible] in FIG. 3. If the address control circuitry has selected a particular row for a read operation, then an electronic switching operation analogous to the mechanical switching of the arm 48 of FIG. 5 takes place. With the switch arm 48 transferred to the "on" side, +9 volts is applied to the base of the PNP transistor 49. Since this is less positive than the +20 volts applied to the emitter, the application of the +9 volts to its base forward biases the transistor 49 and causes transistor 49 to conduct. This, in turn, applies a potential of about +10 volts to the base of the PNP transistor 50, which is less positive than the emitter terminal voltage of +11 volts and transistor 50 conducts. With the transistor 50 conducting, there will be current flow from the common line 51 to the emitter element 50, through the transistor 50 to the connection point B (which is also shown in FIG. 3). At the time that a particular row driver is energized, the switch arm of every other row driver is "OFF" and has +20 volts applied to the base of the corresponding transistor 49 to render these other row drivers inoperative.

Figure 6:
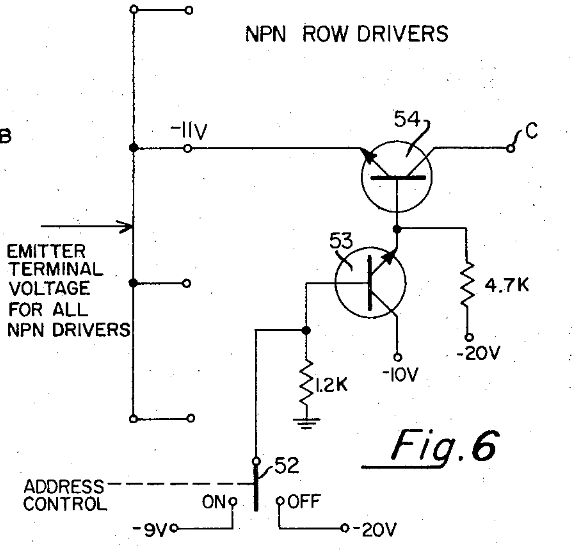
FIG. 6 is a detailed schematic diagram of a NPN row driver showing the connection C of FIG. 3 and some representative voltage and resistor values.

In FIG. 6 there is shown a schematic with some representative values for a NPN row driver which may be used as the circuitry represented by the blocks 35, 40 and 43 of FIG. 3. The operation of the NPN row driver of FIG. 6 is very similar to the operation of the PNP row driver just described in connection with FIG. 5. When the address control circuit signal performs electronically, an analogous operation to switching the arm 52 to the "on" side, −9 volts is applied to the base element of NPN transistor 53. This potential on the base element of the transistor 53 is positive relative to the −20 volts applied to its emitter and causes the transistor 53 to conduct, and consequently to apply a −10 volt potential to the base element of the transistor 54. This potential is, however, more positive than the −11 volt potential applied to the emitter of the transistor 54 and renders this transistor conductive. Hence a write current is effected. It is understood that either conductivity transistor may be used for read or write and the voltages and other circuit parameters for the read and write row drivers will be selected in an operating system so as to preferably cause a full current for read-out and a two-thirds current for writing, as heretofore explained.

Figure 7:
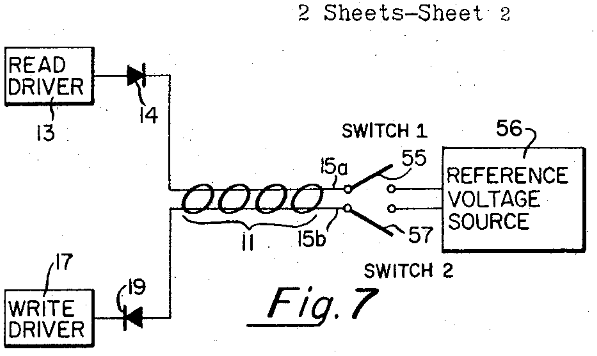
FIG. 7 is an alternate embodiment of the basic building block read-write driver circuit.

In FIG. 7 there is a second embodiment of the basic building block of the read-write drive circuit. It becomes clear after examining FIG. 7 that when there is a read drive current to be provided, the switch 55 will be closed and there will be current flow from the read driver generator 13, through the diode 14, along the threading wire 15*a*, through the closed switch 55 to the reference voltage source 56. In mirror fashion, if a write driver current is necessary, there is current flow from the reference voltage source 56, through the closed switch 57, along the threading wire 15*b*, through the diode 19 to the write driver generator 17. This particular embodiment has the advantage of giving complete independence to the two different direction current driving paths.

In each of the embodiments of FIG. 1 and FIG. 7, there are shown diodes in the two current paths. In FIG. 1 for a read current flow, the diode 19 does not have a blocking effect for current from the read driver 13 to the write driver circuit 17 and therefore the inhibiting of any such current flow to the write driver 17 must be controlled by the voltages applied thereto. However, with respect to a write current, the diode 14 does have a blocking effect with respect to current flow from the reference voltage 16 to the read driver 13. The significant role of the diodes in this basic building block does not become apparent until the building blocks are grouped to form a matrix such as shown in FIG. 3. In the example cited above, when there was to be a read-out of the information bits in the cores 26, it was indicated that the column switch 32 and the PNP row driver 27 were conditioned to provide a read current flow from point B of driver 27 to point A of column switch 32 through the cores 26. An examination of FIG. 3 will reveal that at the time that the column switch 32 and the PNP row driver 27 are conditioned for the read operation, there is in the absence of diode 68, later mentioned, a back circuit from the aforementioned point B to the aforementioned point A which follows the path along the line 58, through the diode 59, along the single wire 60, down along the line 62, through the cores 63 via the single line 64, through the diode 65, back along the line 66, up lead 67, through diode 68, cores 69 via the single line 70 to the conditioned line 31. Current would, in the absence of diode 68, flow along this last-described path, but the diode 68 has a blocking effect and therefore there can be no back or "sneak" current. Other similar sneak paths would also exist were it not for the diodes. Thus, if the diodes were not present, cores such as 61 and 69 would also experience a read-out, and cores 63 could be driven in the write direction, when in fact the data processing system had only desired a read-out of the cores 26.

FIG. 8 shows a plane in the magnetic core arrangement. As described above, the information drive current generator 18 supplies either an opposing information current, as indicated by the arrow 71, or an aiding information current, as indicated by the arrow 72. These current values will be one-third of the total current value necessary to provide an M.M.F. sufficient to fully switch a memory core from one state of magnetization to the other. Also shown in FIG. 8 is a sensing winding 73 which links each of the cores on the plane and in which a voltage is induced by the flux change when any of these cores is switched from one state of magnetization to the other.

Although in FIG. 8 the information windings and the sensing windings are shown as having more than one turn around each of the cores, it is to be understood that a single wire passed therethrough will be sufficient to accomplish an addition of flux, or sense the change of flux respectively. It is also to be understood that in connection with the description of the read-out of the cores 26 and the subsequent write-in to the cores 33, the system can very easily read out and write into the same cores. In other words, very often in normal practice the cores 26 would read out and there would be a write-in to the same cores 26 following thereafter. It also follows that in the specific example given for the read-out of the cores 26 and the subsequent write-in to the cores 33, there probably would be a prior read-out of the cores 33 if any information were contained therein although since a read-in is destructive of information already stored, such a read-out is not necessary.

Related applications assigned to a common assignee include application Ser. No. 308,183, now abandoned, filed Sept. 6, 1952, for "Static Memory System," in the name of Lyle G. Thompson, and application Ser. No. 777,137, now Patent No. 2,993,198, filed Nov. 28, 1958, for "Bidirectional Current Drive Circuit" in the names of G. H. Barnes and R. P. Schneider. This specific application is directed to a description and claiming of a novel transistor driven word line record and read device.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a multi-word linear selection magnetic core memory system, including a plurality of planes forming a three dimensional matrix with each plane having a plurality of magnetizable cores thereon and stacked vertically such that the cores lying along a vertical line represent bits of a word, a read-write drive circuit comprising a first electrical current conducting means threading a group of cores, which cores each lie in a different one of said planes and together represent a word, said current conducting means bypassing the remaining cores other than those constituting a desired word, a reference voltage source coupled to a first end of said current conducting means, a first unidirectional current conducting device having first and second terminals and having its first terminal coupled to a second end of said electrical current conducting means to provide a first direction current conducting path, a second unidirectional current conducting device having first and second terminals and having its second terminal coupled to said second end of said electrical current conducting means to provide a second direction current conducting path, first and second semiconductor variable current generating means respectively coupled to said second terminal of said first unidirectional current conducting device and to said first terminal of said second unidirectional current conducting device to provide current flow alternatively along said first and second direction current conducting paths through said magnetizable cores of only those cores constituting a desired word to provide flux interlinking said cores in a first and second direction, circuit means causing said first semiconductor variable current generating means to provide current flow of sufficient magnitude, in the absence of additional aiding current, to read out said group of cores by switching the switchable ones of said cores into their opposite magnetizable state and circuit means causing said second semiconductor current generator means to provide current current flow for writing desired bits into said group of cores only when flowing in the presence of an information current separately provided by a further electrical current conducting means coupled to the individual bit cores, a separate sensing means for each said plane and during a read out operation connected to receive output signals from only those cores of said desired word, said second current generator means providing substantially two-thirds the current required to switch the word cores during a writing operation and said further electrical conducting means being capable of generating substantially one-third the current required to switch the bit cores and being of a positive or a negative polarity depending upon the binary bit to be stored in each core of said word.

2. In a linear selection magnetic core memory system, including a plurality of planes forming a three dimensional matrix with each plane having a plurality of magnetizable cores thereon and stacked vertically such that the cores lying along a vertical line represent bits of a word, a read-write drive circuit comprising electrical current conducting means threading a group of cores which cores each lie in a different one of said planes and together represent a word, said current conducting means bypassing the remaining cores other than those constituting a desired word, a reference voltage source coupled to a first end of said current conducting means, first and second unidirectional current conducting devices each having first and second terminals and the first terminal of said first unidirectional current conducting device connected to the second terminal of said second unidirectional current conducting device, circuit means coupling a second end of said electrical current conducting means to the common point of said series connected unidirectional devices, first PNP and second NPN transistor variable current generating devices respectively coupled to said second terminal of said first unidirectional current conducting device and to said first terminal of said second unidirectional current conducting device, and triggering means coupled to said first PNP and second NPN transistor variable current generating devices to respectively trigger said last mentioned devices to provide current flow along said electrical current conducting means coupled only to those cores constituting a desired word, said current flow being in a first direction and of sufficient magnitude, in the absence of additional aiding current, to read out said group of cores by switching the switchable ones of said cores into their opposite magnetizable state and to provide current flow along said electrical current conducting means in a second direction to enable information to be written into said group of cores, circuit means causing said current flow in a second direction to be substantially two-thirds that required to switch the cores, and information current means for separately providing a substantially one-third current of a first or second polarity to the individual bit cores of said word.

3. In a linear selection magnetic core memory system, a read-write drive circuit comprising a plurality of magnetizable cores to be driven, a single conductor threading said cores to be driven and bypassing all other memory cores, a first reference voltage source coupled to a first end of said conductor, first and second diodes series connected to each other with the anode of the first being connected to the cathode of the second, circuit means connecting a second end of said single conductor to the series connection of said diodes, first and second transistor variable current generating devices respectively coupled to the cathode of said first diode and the anode of said second diode, and triggering means coupled to said first and second transistor variable current generating means to alternatively trigger said transistor current generating means to provide current flow along said single conductor in a first direction and of sufficient magnitude, in the absence of additional aiding current, to read out all of said cores threaded by said conductor by switching the switchable ones of said cores into their opposite magnetizable state and to provide current flow of substantially two-thirds that required to switch the cores along said single conductor in a second direction to enable information to be stored in said cores when in the presence of an additional current of substantially one-third switching amplitude and of a first or second polarity separately provided to each core of said threaded plurality of cores, said first transistor current generating device including a first NPN transistor having its collector electrode connected to said first diode, its emitter electrode connected to a second reference source voltage, and its base electrode selectively connected to said triggering means, said second transistor current generating device including a first PNP transistor having its collector electrode connected to said second diode, its emitter electrode connected to a third reference source voltage, and its base electrode selectively connected to said triggering means, and means including a second NPN transistor and a second PNP transistor connected between said first reference voltage source and said first end of said wire, only one of which conducts during one operation to permit a current flow through said wire threading said cores in a first direction to read information out of said cores and in a second direction to enable information to be stored in said cores.

4. In a multi-word linear selection magnetic core memory system, including a plurality of planes forming a three-dimensional matrix with each plane having a plurality of magnetizable cores thereon and stacked vertically such that the cores lying along a vertical line represent bits of a word, a read-write drive circuit arrangement comprising a plurality of electrical current conducting means with one each threading respectively a group of cores which cores each lie in a different one of said planes and together represent a word, said electrical current conducting means arranged according to rows and columns and bypassing all cores other than those constituting a desired word, a plurality of reference voltage sources with one each assigned to a column of said electrical current conducting means, circuit means connecting a first end of each of said electrical current conducting means lying along a column to its associated reference voltage source, a plurality of first and second unidirectional current conducting devices, one each of said first and second unidirectional current conducting devices respectively associated with a particular one of said electrical current conducting means, each first unidirectional current device respectively coupled to a second end of its associated electrical current conducting means to provide a first direction current conducting path, each of said second unidirectional current conducting devices respectively coupled to a second end of its associated electrical current conducting means to provide a second direction current conlucting path, a plurality of first and second semiconductor ariable current generating means, one each of said first nd second semiconductor variable current generating neans associated with a row of said electrical current onducting means, each of the first unidirectional current onducting devices associated with electrical current con- lucting means lying along a row being connected to said irst semiconductor variable current generating device as- ociated with said row, each of said second unidirectional urrent conducting devices associated with electrical cur- ent conducting means lying along a row being connected o said second semiconductor variable current generating neans associated with said row, and switching means oupled to each of said reference voltage sources and said emiconductor current generating means to selectively con- lition one of said semiconductor reference voltage sources nd a particular one of said current generating means to rovide electrical current flow through one of said groups f cores along one of said associated first and second lirection current conducting paths, circuit means causing full read-out current to flow in said first direction cur- ent conducting path and to cause substantially two-thirds vrite current to flow in said second direction current con- lucting path, and information current means for sep- rately providing a substantially one-third current of a irst or second polarity to the individual bit cores of said elected word.

5. A word select magnetic core memory system, com- rising a plurality of planes forming a three dimensional natrix with each plane having a plurality of magnetizable istable state cores thereon and assembled in a stack nd arranged such that the corresponding cores along ne of the dimensions of said stack represent individual its of a plurality of words, a read-write drive circuit omprising at least one drive conductor threaded along aid one dimension of said stack and coupled to each of aid cores constituting one of said words and bypassing he remaining cores other than those constituting a de- ired word, a reference voltage source connected to one nd of said at least one drive conductor including a emiconductor switching means which may be selectively nabled to permit current flow through said at least one lrive conductor in a first read or a second write direction, first and a second diode each connected to said at least ne drive conductor, said diodes being oppositely directed o as to permit current flow in opposite directions along aid at least one drive conductor, a separate read source nd write source electrically connected to the other end f said at least one drive conductor in series with said ppositely directed diodes, said read source including a ead transistor switched on during a selected read opera- ion to provide current in a first direction and of sufficient magnitude, in the absence of additional aiding current, to readout said word of cores by switching the switchable ones of said cores into their opposite magnetizable state, said write source including a write transistor switched on during a selected write operation to provide current in a second direction and of substantially two-thirds the magnitude required to switch said word of cores to its other bistable state, said read and write transistors having their emitter-collector circuits in series with said diodes and including a further separate switching transistor means connected to the base electrode of each said read and write transistor, means for rendering said separate switching means selectively conductive in response to an address command, and a further separate information conductor coupled to each core of said word of cores and provided with information source means furnishing current, of substantially one-third the magnitude required to switch said cores, of selectively either a first or a second direction through said information conductors so as to be additive to switch certain ones of said cores to their other bistable state and to be subtractive to provide a net nonswitching current of substantially only one-third the magnitude required to switch certain other ones of said cores.

6. A word select memory system as defined in claim 5 wherein said read-write drive circuit comprises only a single drive conductor with said first and second diodes connected to a common end of said conductor.

7. A word select memory system as defined in claim 5 wherein said read-write drive circuit comprises a pair of drive conductors, one serving as a read drive and the other as a write drive conductor and wherein a common reference voltage source serves for either a read or a write operation.

8. A word select memory system as defined in claim 5 wherein a further separate sense conductor is coupled to each core of said word of cores for providing sense signals only from those cores which were switchable during said read operation.

References Cited

UNITED STATES PATENTS

| | | | |
|---|---|---|---|
| 2,910,674 | 10/1959 | Wittenberg | 340—174 |
| 2,914,754 | 11/1959 | Ganzhorn | 340—174 |
| 2,942,239 | 6/1960 | Eckert | 340—174 |
| 3,027,546 | 3/1962 | Howes | 340—174 |
| 3,069,661 | 12/1962 | Gianola | 340—174 |
| 3,083,353 | 3/1963 | Bobeck | 340—174 |
| 3,154,763 | 10/1964 | Bornhauser | 340—174 |
| 3,172,087 | 3/1965 | Durgin | 340—174 |

OTHER REFERENCES

Rajchman, Jan A.: "RCA Review," Research Department RCA Laboratories Division, Princeton, N.J.; June 1952; pp. 184–187.

BERNARD KONICK, *Primary Examiner.*

IRVING L. SRAGOW, *Examiner.*

M. S. GITTES, *Assistant Examiner.*